US006678926B2

(12) United States Patent
Watters (10) Patent No.: US 6,678,926 B2
(45) Date of Patent: Jan. 20, 2004

(54) METHOD AND APPARATUS FOR MANUFACTURING BATTERY PLATES

(75) Inventor: Jimmy H. Watters, Anderson, IN (US)

(73) Assignee: Delphi Technologies, Inc., Troy, MI (US)

(*) Notice: Subject to any disclaimer, the term of this patent is extended or adjusted under 35 U.S.C. 154(b) by 258 days.

(21) Appl. No.: 09/888,109

(22) Filed: Jun. 22, 2001

(65) Prior Publication Data

US 2002/0194715 A1 Dec. 26, 2002

(51) Int. Cl.[7] .................... H01M 4/74; B21D 43/00; B26D 3/16
(52) U.S. Cl. ................... 29/2; 429/241; 429/242
(58) Field of Search .................. 429/241, 242, 429/247; 29/2.11–2.25

(56) References Cited

U.S. PATENT DOCUMENTS

| | | | | |
|---|---|---|---|---|
| 3,819,412 A | * | 6/1974 | Taylor et al. ............... 429/210 |
| 3,853,626 A | | 12/1974 | Daniels, Jr. et al. .......... 136/36 |
| 3,962,941 A | * | 6/1976 | Kober ......................... 83/228 |
| 4,270,424 A | * | 6/1981 | Sandmore ..................... 83/167 |
| 4,271,586 A | | 6/1981 | McCartney, Jr. ........... 29/623.5 |
| 4,733,462 A | * | 3/1988 | Kawatani ...................... 29/840 |
| 5,253,559 A | * | 10/1993 | Philippe et al. ............... 83/133 |
| 5,263,237 A | * | 11/1993 | Gallant et al. ........... 29/402.06 |
| 5,796,161 A | * | 8/1998 | Moon ......................... 257/676 |
| 5,996,805 A | * | 12/1999 | Evers ......................... 206/723 |
| 6,141,869 A | * | 11/2000 | Crane et al. .................. 29/842 |
| 6,195,875 B1 | * | 3/2001 | Neuenschwander .......... 29/732 |

* cited by examiner

Primary Examiner—Bruce F. Bell
Assistant Examiner—Donald V. Scaltrito
(74) Attorney, Agent, or Firm—Jimmy L. Funke (57) ABSTRACT

An improved apparatus and method for making lead-acid storage battery plates comprising an alignment puncher for creating a plurality of alignment holes in a lead strip as the lead strip is progressively expanded and cut into a grid like pattern on an expander die system. The alignment of the lead strip is accomplished by inserting at least one alignment pin into at least one of the plurality of alignment holes that have been punched into the lead strip as the lead strip is progressively expanded and cut into a plurality of wire-like segments along opposing edges of the lead strip. After each cut, the alignment pin retracts while the lead strip is indexed.

8 Claims, 9 Drawing Sheets

METHOD AND APPARATUS FOR MANUFACTURING BATTERY PLATES

BACKGROUND OF THE INVENTION

This invention relates to an automated process for the manufacture of lead-acid batteries and an associated apparatus and new features of battery design and construction resulting therefrom. More specifically, this invention pertains to an improved lead-acid battery and an efficient method and associated apparatus for its manufacture in a large variety of shapes and sizes for uses such as automotive starting, traction, industrial, and small sealed lead-acid battery applications.

Lead acid batteries are a well known source of energy. The conventional lead-acid battery consists of a plurality of positive plates and a plurality of negative plates separated by porous separators. Conventionally, each positive and negative plate comprises a supporting conductive grid structure which is normally made of lead or a lead alloy and which supports an electrochemically active paste material. The lead grids serve the dual purpose of supporting the paste material as well as acting as electrical current conductors.

The lead acid battery plates are made by pasting a leady oxide material over the lead wire grid. Separate positive and negative plates are pasted and cured, with each of the plates having a lug disposed on the top portion of the plate. Prior to being placed in the battery container, a separator is placed between each plate and the negative and positive plate lugs are joined by two separate plate straps, one for the positive plate lugs and one for the negative plate lugs. Once placed into the container the intercell connections are made and the battery container and cover are sealed together. The positive and negative posts are welded in the cover, the acid is added, and the battery is formed electrochemically.

As is well known, the chemical reaction between the battery plates and the acid produces an electric charge which can be used to start an automobile, for example. The chemical reaction is reversible so that a generator in an automobile, for example, can recharge the battery.

There are many known processes for making lead-acid batteries. One known process is disclosed in U.S. Pat. No. 4,271,586. This process involves feeding a ribbon of lead into an inline expander (such as is described in U.S. Pat. No. 3,853,626) to produce a continuous bilateral length of grid making stock. The stock has a central unexpanded strip and two unexpanded strips at the lateral edges thereof. Between the central unexpanded strip and each lateral edge, there is a network of grid wires formed by the expander. The battery grid-making stock enters a belt paster for filling the battery grid network with battery paste. The pasting machine sandwiches the battery grid making stock and paste between paper strips fed from paper rolls. Battery plate forming stock exits the paster and passes into an oven for flash drying. Following flash drying and cutting, the battery plate forming stock is ready for curing. After curing, a stacker accumulates the battery plates for subsequent processing into a lead-acid battery.

The subsequent processing involves making a battery element out of the negative and positive battery grids and the separators. After this, the positive lugs of the battery grids and the negative lugs of the battery grids are separately joined by exposing each of them to molten lead, which subsequently hardens to form the plate strap. The battery grids are then placed into the container, the intercell connection made, and the battery container and cover are sealingly joined. Finally, the posts are formed on the battery cover.

The present invention relates to a highly commercial acceptable process and apparatus for continuously making and expanding lead grids for a lead-acid storage battery from a narrow sheet or strip of lead utilizing a modified in-line, dual expansion guillotine process and the grid produced is satisfactory for commercial manufacture and customer use. The grids made by this invention are useful with both positive and negative battery plates.

Presently, there are many different techniques for fabricating current collectors including subjecting a lead substrate to mechanical expansion and perforating the lead substrate, thereby creating the battery grid. However, mechanically expanded lead plates that are perforated often have burrs which are potential contributors to battery shorting.

It would, therefore, be advantageous to provide a method and apparatus for producing lead plate battery grids for a lead acid storage battery which has less burrs, thereby, reducing failures from shorts.

Therefore, it would be desirable to provide an improvement, which overcomes the aforementioned inadequacies of the prior art and provides a significant contribution to the advancement of the art of battery plate production.

Accordingly, what is needed in the art is an improvement for manufacturing battery grids in both the geometry of the battery grid design as well as in the battery grid wire structure.

It would be further desirable to provide a method and apparatus for producing an improved battery grid with reproducible results.

It would also be desirable to provide a method and apparatus for enhancing both electrical efficiency and castability of the battery grid.

It would also be desirable to provide a method and apparatus for improving the battery grid that can easily be adapted to current manufacturing techniques.

It would also be desirable to provide a method and apparatus for economically continuously producing battery plate grids over a wide range of lead alloys and metal contents.

It would be further desirable to provide a method and apparatus for improving the battery grid that involves feeding a lead strip onto a frame between opposing rows of progressive dies and cutters.

It would also be desirable to provide a method and apparatus for improving the grid by punching an alignment hole into the lead strip during the expanding and cutting process.

It would also be desirable to provide a method and apparatus for improving the battery grid by aligning the lead strip through the use of at least one alignment pin into at least one of the alignment holes in the lead strip.

It would also be desirable to provide a method and apparatus for improving the battery grid that employs an indexing mechanism that advances the lead strip an indexed distance corresponding to the distance the lead strip moves during the expanding and cutting process.

SUMMARY OF THE INVENTION

In accordance with one aspect of the present invention, there is provided method and apparatus for manufacturing an improved battery plate.

In one preferred embodiment of the present invention, the method of making lead-acid storage battery plates comprises the step of aligning a lead strip as it is progressively expanded and cut into a grid pattern on an expander die system. Specifically, the lead strip is fed onto a frame between opposing rows of progressive dies and cutters. An alignment hole is punched into the lead strip each time the lead strip is progressively indexed on the frame between opposing rows of progressive dies and cutters. The alignment step is accomplished by inserting at least one alignment pin into at least one of the alignment holes that have been punched into the lead strip as the lead strip is progressively expanded and cut into a plurality of wire-like segments along opposing edges of the lead strip. After each cut, the alignment pin retracts while the lead strip is indexed.

In another exemplary embodiment of the present invention, the apparatus for use in the manufacture of plates for a lead-acid storage battery in a continuous operation, comprises an alignment means for aligning a lead strip as it is progressively expanded and cut into a grid pattern. Specifically, a lead strip is placed onto a frame having a first end, a second end and a series of progressive dies and cutters positioned longitudinally along the frame. An alignment puncher is provided for punching an alignment hole into the lead strip each time the lead strip is progressively indexed on the frame between opposing rows of progressive dies and cutters. An indexing mechanism advances the lead strip an indexed distance corresponding to the distance the lead strip moves during the expanding and cutting process. At least one alignment pin is provided which projects into at least one of the alignment holes in the lead strip for aligning the lead strip during the expanding and cutting process. The alignment pin retracts during the indexing of the lead strip.

A feature of the present invention is to provide an alignment puncher at the first end of the frame and an indexing mechanism at the second end of the frame.

Another feature of the present invention is to provide an indexing mechanism that is a linear feeder.

Still yet another feature of the present invention is to provide an indexing mechanism that is easily adaptable to the present technology for expanding and cutting lead strip into battery grid.

Another feature of the present invention is to provide a plurality of alignment pins that are spring controlled, thereby allowing the plurality of alignment pins to reposition the lead strip as the alignment pins are inserted into the alignment holes.

Yet another feature of the present invention is to provide an indexing mechanism along the centerline of the lead strip.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The invention will become more readily apparent from the following description of preferred embodiments thereof shown, by way of example only, in the accompanying drawings wherein.

Similar reference characters refer to similar parts throughout the several views of the drawings.

DETAILED DESCRIPTION OF THE INVENTION

Reference will now be made to the drawings.

This invention relates to making battery plates from continuous lengths of expanded lead grid-making stock. More specifically, this invention relates to a method and apparatus for aligning lead battery plate-making stock as it is expanded and cut into a grid pattern.

A process for manufacturing grids to form positive and/or negatives plates for storage batteries or the like is shown in U.S. Pat. No. 3,853,626. This patent has wire meshes or grids that are formed from a metal strip which has two substantially parallel boundary edges. In accordance with the process described, the grids are manufactured in the same manner as expanded metal. In other words, rows of cut slits are initially formed extending approximately parallel to the boundary edges of a metal strip, the ends of said slits having a fixed spacing from one another. The adjacent rows of such slits are so offset relative to one another in the longitudinal direction that the section of material which remains between those facing ends of two slits which lies on the same line is always disposed at half the length of the slits in the adjacent row. Thereafter, the bars of material which are left alongside the separately cut slits are deformed transversely of their longitudinal direction by a suitable tool, so that diamond-shaped mesh openings are formed between them.

Figure 1:
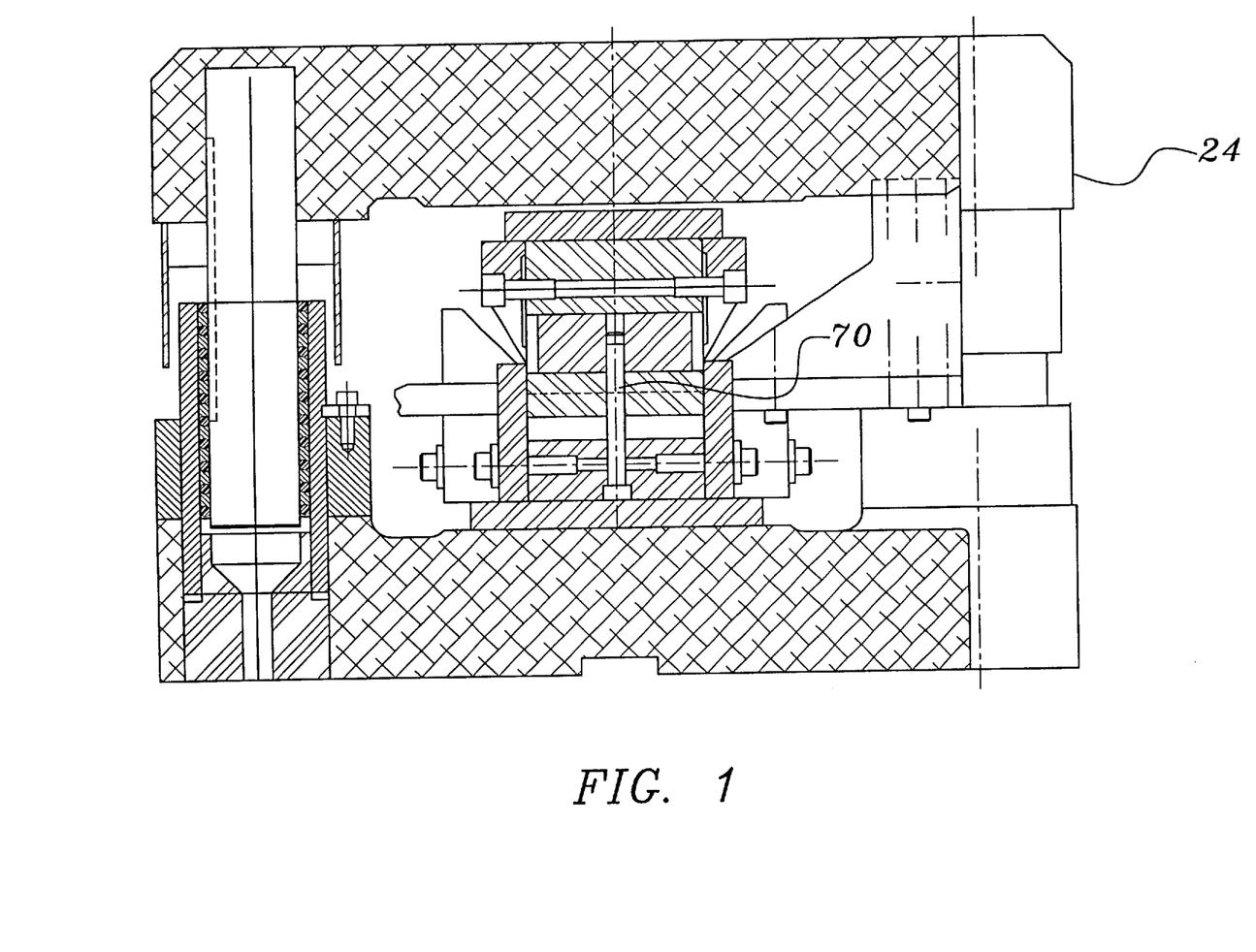
FIG. 1 is an enlarged view of an individual expander die built according to the present invention.

FIG. 1 is an enlarged view of an individual expander die built according to the present invention. Specifically, an alignment pin 70 has been placed in the center of the expander die 24 for aligning a strip of material as it is cut and expanded along an expander die system.

Figure 2:
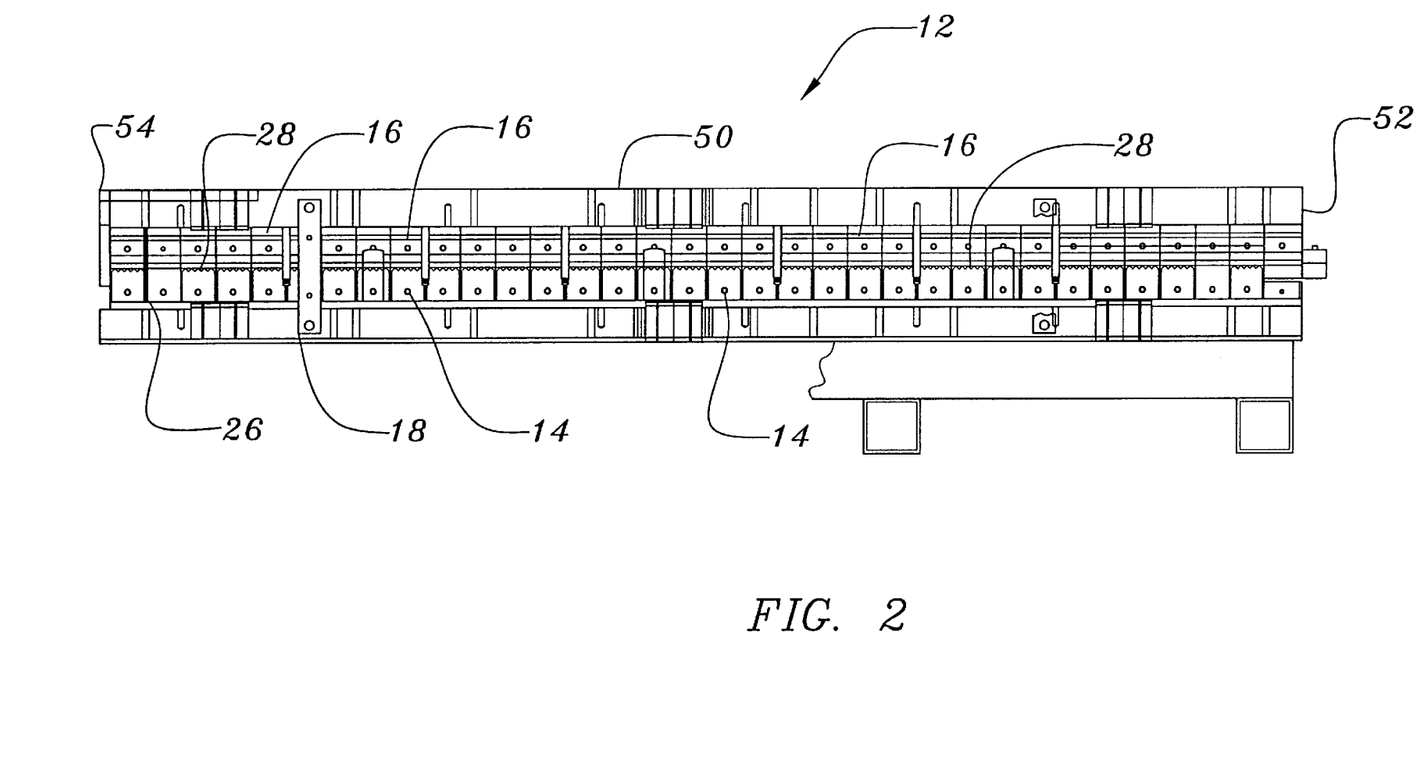
FIG. 2 is a top view of a conventional expander die system for making battery plates.

FIG. 2 is an enlarged side elevational view of the expanding dies of the expander portion of a conventional expander die system 12 for making battery plates. FIG. 2 shows reciprocating dies 14, fixed position cutters 16 and stripper plate 18. The reciprocating dies 14 are shaped at their top 28 as to cause both slitting and stretching of the strip of material as it progresses through the expander die system 12. While a variety of shapes can be used for the top of the reciprocating dies to effect the stretching, a semi-diamond shape is preferred. Each upward motion of the reciprocating dies 14 forms one-half of a paste retaining cell with the remainder being formed downstream of that die 14 during the formation of the next adjacent tier.

Accordingly, as the strip of material 20 proceeds through the expander die system 12, a diamond-shaped pattern of cut slits are formed. After several cuts, the strip of material will have a diamond shape pattern throughout.

The problem that may arise with the prior art expander die system 12 as described in U.S. Pat. No. 3,853,626 is that the strip of material may become misaligned as it proceeds through the expander die system. Specifically, without an alignment mechanism, the strip of material wanders back and forth on either side of the die centerline, thereby, creating uneven expansion. As a result, the prior art can produce battery plates that have an overall height variation of greater than 3.0 mm.

Figure 3:
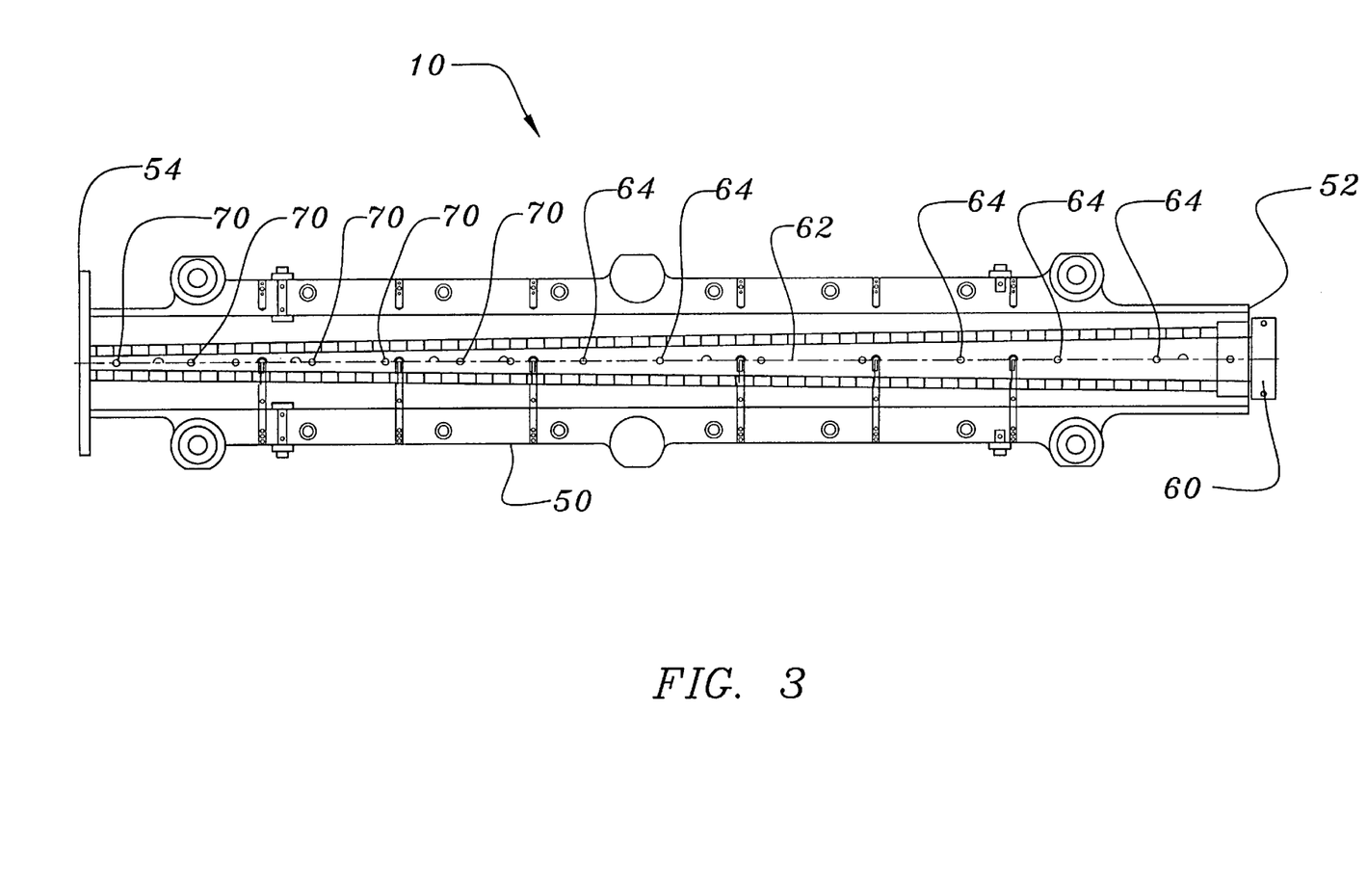
FIG. 3 is a top view of a modified expander die system for making battery plates built according to the present invention.

FIG. 3 is a top view of a modified expander die system for making battery plates built according to the present invention. The invention relates to a machine for manufacturing battery plate metal grids, the modified expander die system 10 of the present invention comprising a frame 50 having a first end 52, a second end 54 and a series of progressive reciprocating dies and cutters positioned longitudinally on the frame 50. The improvement of the present invention being an alignment puncher 60 that punches an alignment hole 64 each time a strip of material is indexed an indexed distance along the frame 50. In addition, at least one alignment pin 70 is provided along the centerline 62 of the modified expander die system 10 for engaging at least one of the alignment holes 64 that have been created in the strip of material by the alignment puncher 60.

Figure 4:
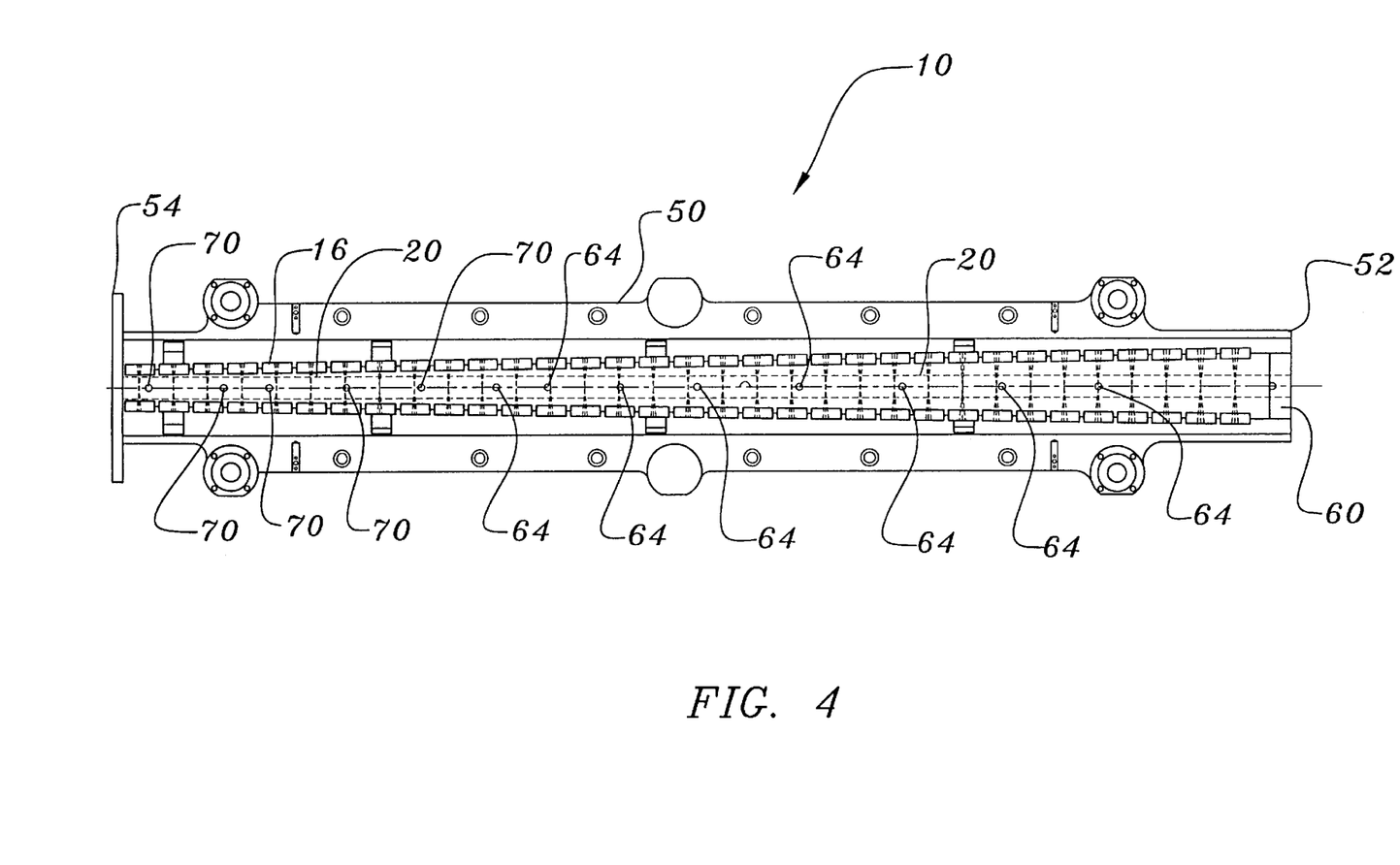
FIG. 4 is a top view of a modified expander die system showing a strip of material being cut and expanded for making battery plates built according to the present invention.

FIG. 4 is a top view of a modified expander die system 10 showing a strip of material 20 being cut and expanded for making battery plates built according to the present invention. The process is initiated by feeding the strip of material (usually thin, narrow ribbon of lead) 20 into the modified continuous, in-line, dual expansion, guillotine-type expander system 10. The strip of material is usually made of lead. Lead sheets useful with this technique vary in thickness from about 0.035 to about 0.05 inch. The thinner sheets are used primarily in negative plates and the thicker sheets in positive plates. Conventionally, the strip of material will have a predetermined thickness, a narrow width and longitudinal edges.

The strip of material 20 is centered on the frame 50 as it is fed onto the modified expander die system 10 between opposing rows of progressive dies and cutters. The strip of material 20 has longitudinal edges which are parallel to one another as the strip of material 20 is placed onto the expander die system 10.

The moving strip of material 20 engages reciprocating dies which are driven up and down by an appropriate means (not shown). The reciprocating dies push the longitudinal edges of the strip of material 20 against the cutters and thereby peel portions of the edge away from the strip of material 20.

The alignment puncher 60 punches an alignment hole 64 in the strip of material 20 as the strip of material 20 is expanded and cut. The alignment puncher 60 is positioned at the first end 52 of the frame 50.

An indexing mechanism (not shown) advances the strip of material 20 an indexed distance. The indexed distance corresponds to the distance the strip of material 20 is moved each time the strip of material is expanded and cut. The alignment puncher 60 punches an alignment hole 64 into the strip of material in increments equal to the indexed distance. The indexing mechanism is preferably positioned at the second end 54 of the frame 50. A typical indexing mechanism is a linear feeder. In practice, the indexed distance is equal to 1.8075 inches between centers of the alignment holes.

At a minimum, there must be at least one alignment pin 70 that projects into at least one of the alignment holes 64 that were made in the strip of material 20. The alignment pin 70 retracts during the indexing of the strip of material 20. In a preferred embodiment, the alignment pin 70 is spring loaded. When the alignment pin 70 is activated to the up position, the alignment pin 70 has the ability to push the strip of material 20 as the alignment pin 70 is rising in order to adjust the strip of material 20 to a centered position about the alignment hole 64.

At least one alignment pin 70 is inserted into at least one of the alignment holes 64 during the cutting and expanding of the strip of material 20. The alignment pin 70 aligns the strip of material 20 to the centerline of the frame 50 to ensure that the battery plate that is produced has a reproducible overall height and no burrs or open ends in the wire-like segments along the opposing edges of the strip of material 20.

After each progressive cut and expansion, the alignment pin 70 is retracted to allow the indexing mechanism to index the strip of material 20 an indexed distance. Once the strip of material 20 advances the indexed distance, the alignment pin 70 can be reinserted into one of the alignment holes 64 for the next progressive cut and expansion.

In a preferred embodiment, sixteen alignment pins are used to control the alignment of an approximately seven foot strip of material.

The present invention improves the manufacturing of battery plates in that the strip of material is aligned during the expanding and cutting process on an expander die system built according to the present invention. With the present invention, overall height variation of battery plates can be reduced to less than 1.0 mm. In addition, the alignment of the strip of material ensures reproducible battery plates that do not have burrs and/or open ends.

Figure 5:
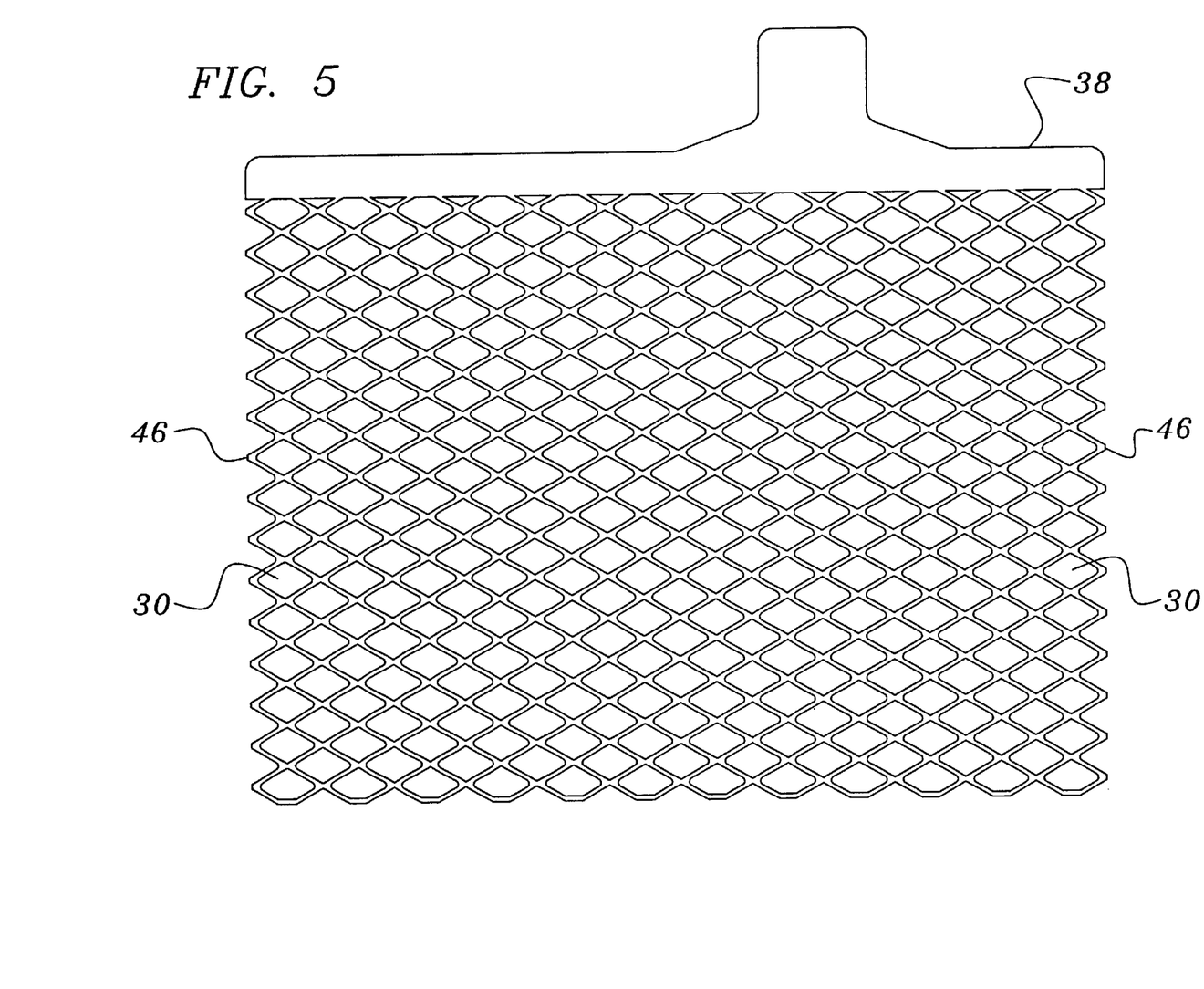
FIG. 5 is a front elevational view of a battery plate that was produced on an expander die system built according to the present invention as shown in FIG. 4.

FIG. 5 is a front elevational view of a battery plate that was produced on an expander die system built according to the present invention as shown in FIG. 4. As best shown in FIG. 5, the battery plate 38 manufactured on a modified expander die system built according to the present invention has diamond shaped 30 junctions that have closed ends 46. Since the diamond shaped 30 junctions have closed ends, there are no burrs that can result in shorts when the battery plate is placed with other battery plates in a standard storage battery.

Figure 6:
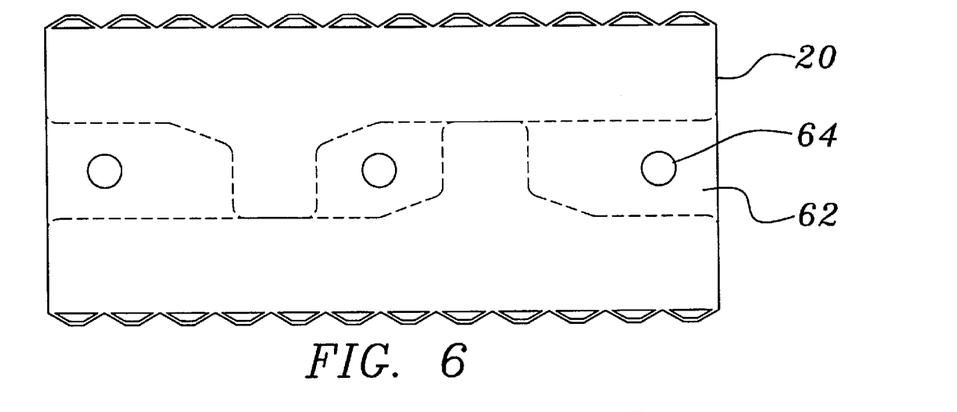
FIG. 6 is a top sectional view of a strip of material after the first cut on an expander die system built according to the present invention.

FIGS. 6 through 12 show several of the incremental patterns formed into the strip of material 20 as it progresses along the modified expander die system. FIG. 6 is a top sectional view of the strip of material 20 after the first cut on the modified expander die system built according to the present invention. The alignment holes 64 have been punched into the strip of material 20 along the centerline 62.

Figure 7:
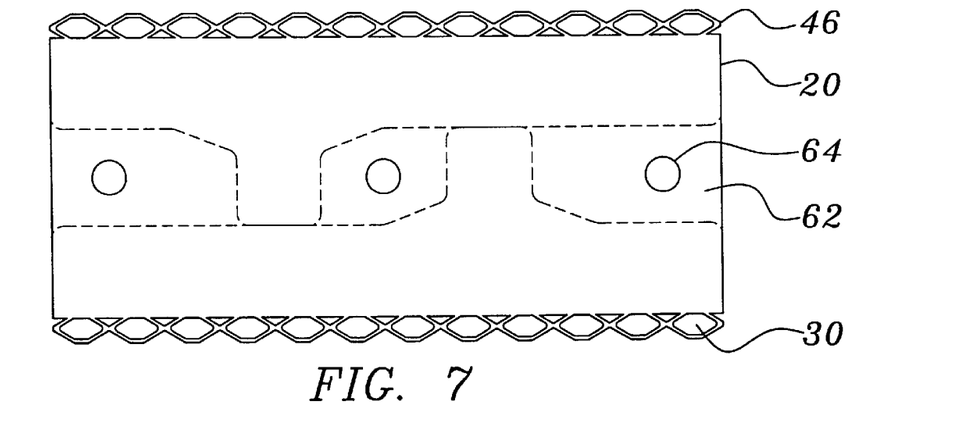
FIG. 7 is a top sectional view of a strip of material after the second cut on an expander die system built according to the present invention.

FIG. 7 is a top sectional view of a strip of material after the second cut on the modified expander die system built according to the present invention. At this point, the first complete row of the diamond shape 30 pattern has formed.

Figure 8:
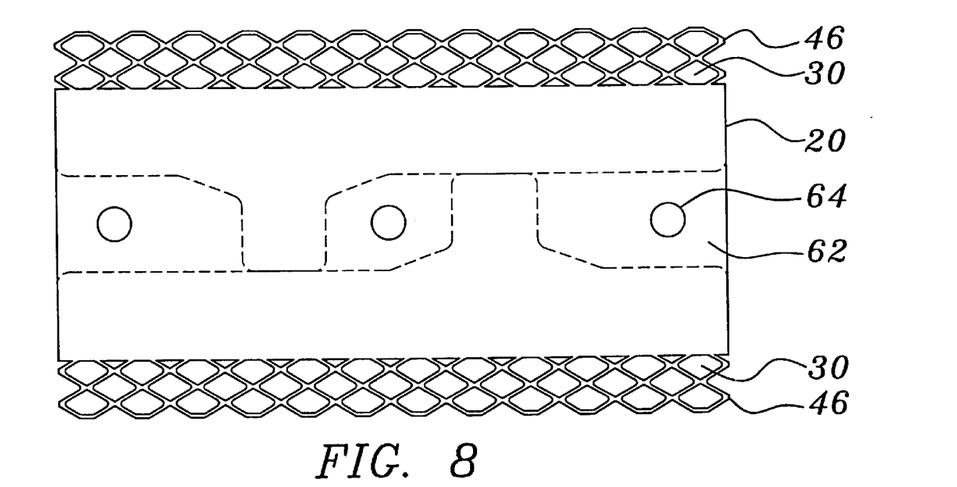
FIG. 8 is a top sectional view of a strip of material after the fourth cut on an expander die system built according to the present invention.

FIG. 8 is a top sectional view of a strip of material after the fourth cut on the modified expander die system built according to the present invention. At this point, two complete rows of the diamond shape 30 pattern has formed. Also, it is clear that the outer edges of the diamond shape 30 pattern have all closed ends 46.

Figure 9:
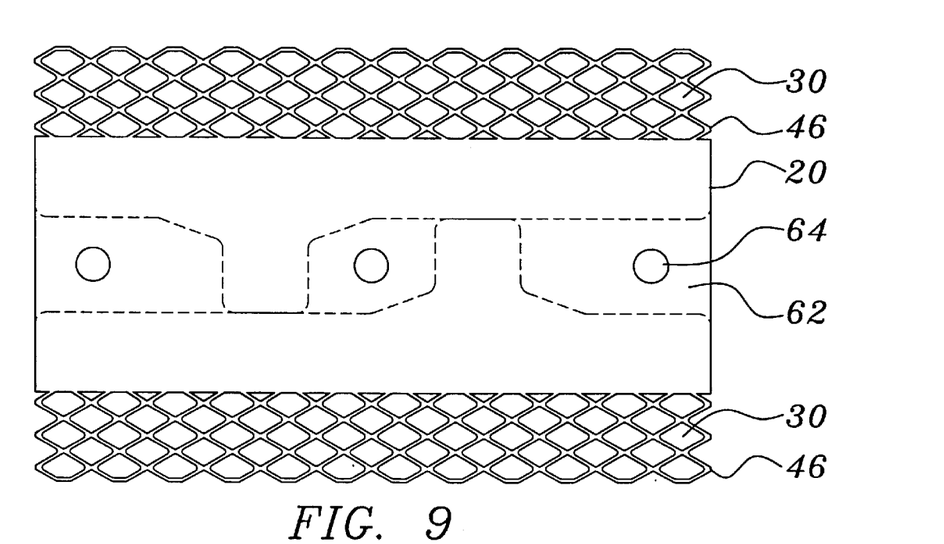
FIG. 9 is a top sectional view of a strip of material after the sixth cut on an expander die system built according to the present invention.

FIG. 9 is a top sectional view of a strip of material after the sixth cut on the modified expander die system built according to the present invention. At this point, the third complete row of the diamond shape 30 pattern has formed.

Figure 10:
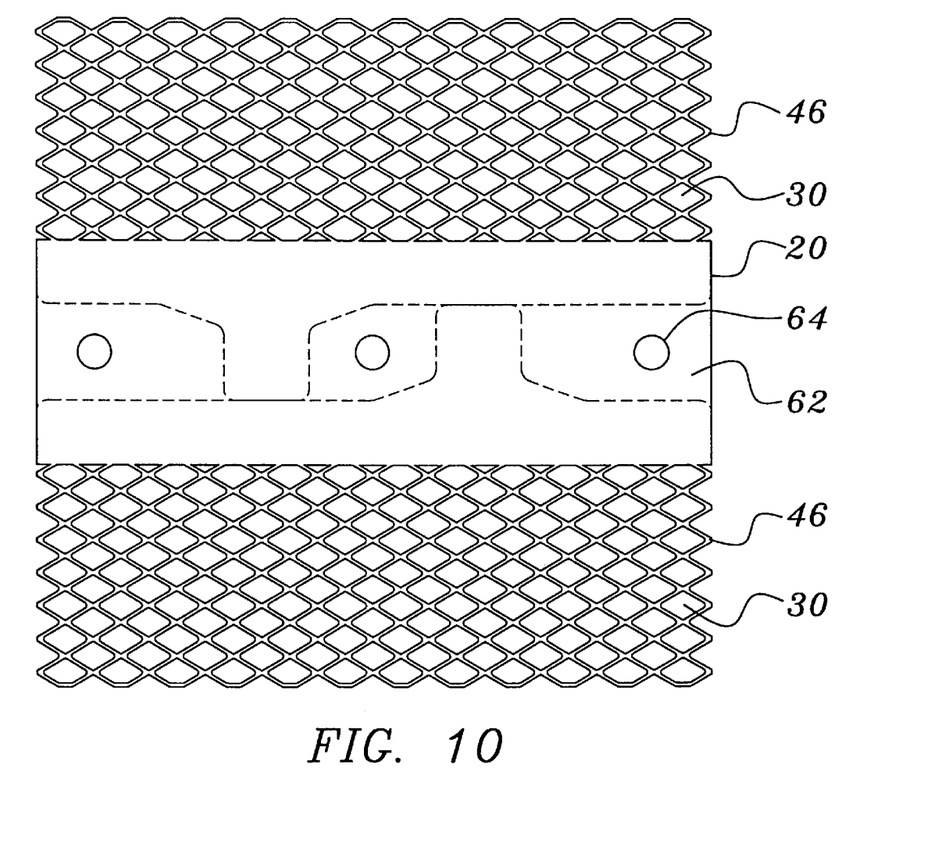
FIG. 10 is a top sectional view of a strip of material after the fourteenth cut on an expander die system built according to the present invention.

FIG. 10 is a top sectional view of a strip of material after the fourteenth cut on the modified expander die system built according to the present invention. At this point, the seventh complete row of the diamond shape 30 pattern has formed.

Figure 11:
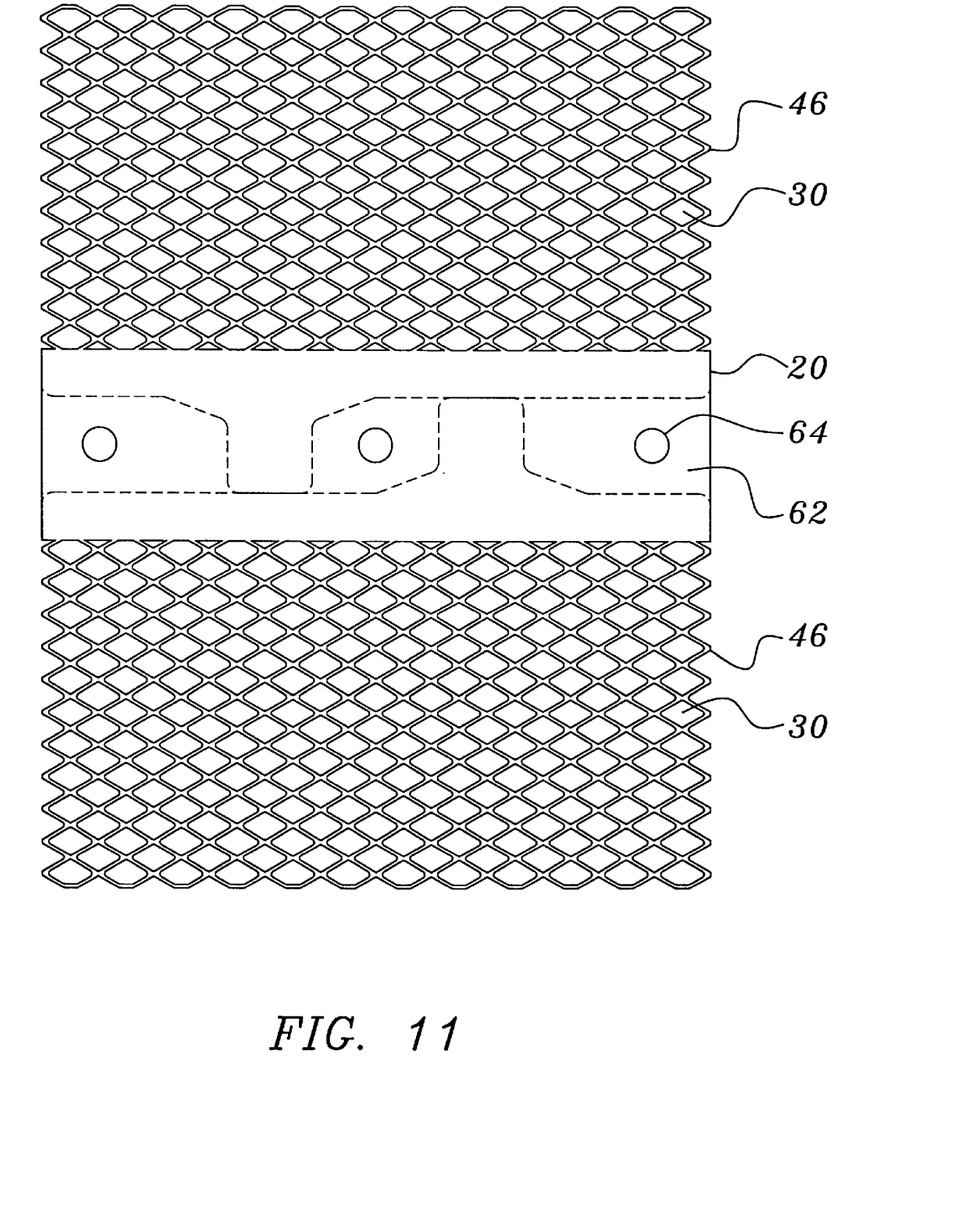
FIG. 11 is a top sectional view of a strip of material after the twenty-second cut on an expander die system built according to the present invention.

FIG. 11 is a top sectional view of a strip of material after the twenty-second cut on the modified expander die system built according to the present invention. At this point, the eleventh complete row of the diamond shape 30 pattern has formed.

Figure 12:
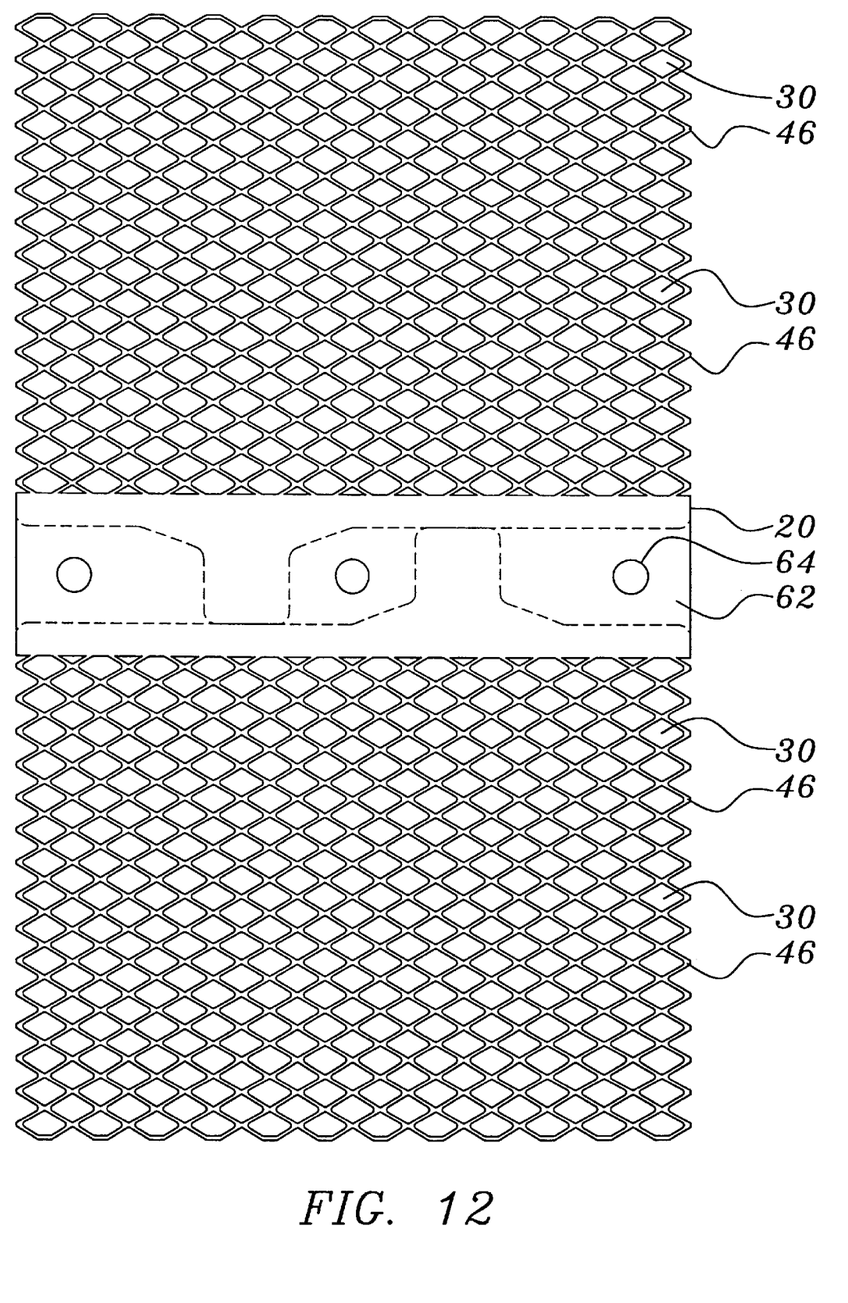
FIG. 12 is a top sectional view of a strip of material after the thirtieth cut on an expander die system built according to the present invention.

FIG. 12 is a top sectional view of a strip of material after the thirtieth cut on the modified expander die system built according to the present invention. At this point, the fifteenth complete row of the diamond shape 30 pattern has formed and the battery plate pattern is complete.

The alignment of the strip of material of the present invention is achieved through an inexpensive modification to the existing expander die system. The alignment mechanism of the present invention can also be easily modified to adapt to changes in the thickness of the strip of material that is being processed for a particular battery plate.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

I claim:

1. A method of making lead-acid storage battery plates comprising:

(a) feeding a lead strip onto a frame between opposing rows of progressive dies and cutters;

(b) progressively indexing said lead strip an indexed distance;

(c) punching an alignment hole in said lead strip each time said lead strip is indexed said indexed distance;

(d) inserting at least one alignment pin into at least one of said alignment holes in said lead strip;

(d) aligning said lead strip by means of said alignment holes in said lead strip and said alignment pin;

(e) progressively expanding and cutting a plurality of wire-like segments along opposing edges of said lead strip; and (f) retracting said alignment pin during said indexing.

2. The method of making lead-acid storage battery plates according to claim 1, wherein said lead strip comprises a predetermined thickness, a relatively narrow width and longitudinal edges.

3. The method of making lead-acid storage battery plates according to claim 1, wherein said alignment pin repositions said lead strip through the placement of said alignment pin into at least one of said alignment holes.

4. The method of making lead-acid storage battery plates according to claim 1 further comprising:

punching said plurality of alignment holes along a centerline of said lead strip.

5. The apparatus for use in the manufacture of plates for a lead-acid storage battery according to claim 4, wherein said alignment puncher is positioned at said first end of said frame and said indexing mechanism is positioned at said second end of said frame.

6. The apparatus for use in the manufacture of plates for a lead-acid storage battery according to claim 5, wherein said indexing mechanism comprises a linear feeder.

7. An apparatus for use in the manufacture of plates for a lead-acid storage battery in a continuous operation, said apparatus comprising:

a frame having a first end, a second end and a series of progressive dies and cutters positioned longitudinally on said frame;

an indexing mechanism, said indexing mechanism configured to advance a lead strip an indexed distance;

an alignment puncher, said alignment puncher configured to make an alignment hole in said lead strip each time said lead strip is indexed said indexed distance; and at least one alignment pin, said alignment pin configured to project into at least one of said alignment holes in said lead strip, said alignment pin being further configured to retract during indexing, wherein said alignment pin is spring controlled, said alignment pin configured to reposition said lead strip through the placement of said alignment pin into at least one of said alignment holes.

8. An apparatus for use in the manufacture of Plates for a lead-acid storage battery in a continuous operation, said apparatus comprising:

a frame having a first end, a second end and a series of progressive dies and cutters positioned longitudinally on said frame;

an indexing mechanism, said indexing mechanism configured to advance a lead strip an indexed distance;

an alignment puncher, said alignment puncher configured to make an alignment hole in said lead strip each time said lead strip is indexed said indexed distance, wherein said alignment holes are punched along a centerline of said lead strip; and at least one alignment pin, said alignment pin configured to project into at least one of said alignment holes in said lead strip, said alignment pin being further configured to retract during indexing.

* * * * *